(12) United States Patent
Pitz et al.

(10) Patent No.: US 10,558,193 B2
(45) Date of Patent: Feb. 11, 2020

(54) METHOD FOR MACHINING A WORKPIECE IN A MACHINE TOOL WITH OPTIMIZED MACHINING TIME

(71) Applicant: SIEMENS AKTIENGESELLSCHAFT, München (DE)

(72) Inventors: Thomas Pitz, Rutesheim (DE); Ralf Spielmann, Stuttgart (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 232 days.

(21) Appl. No.: 15/459,830

(22) Filed: Mar. 15, 2017

(65) Prior Publication Data

US 2017/0269571 A1 Sep. 21, 2017

(30) Foreign Application Priority Data

Mar. 16, 2016 (EP) .................................. 16160679

(51) Int. Cl.
*B25J 9/16* (2006.01)
*G05B 19/21* (2006.01)
*G05B 13/02* (2006.01)

(52) U.S. Cl.
CPC ........... *G05B 19/21* (2013.01); *G05B 13/021* (2013.01); *G05B 2219/37582* (2013.01)

(58) Field of Classification Search
CPC ............ G05B 19/4069; G05B 19/4061; G05B 2219/35316; G05B 19/416;

(Continued)

(56) References Cited

U.S. PATENT DOCUMENTS 4,888,707 A * 12/1989 Shimada ................ B25J 9/1666
700/255
4,974,165 A * 11/1990 Locke ................ G05B 19/4166
318/572

(Continued)

FOREIGN PATENT DOCUMENTS

CN 101063880 A 10/2007
CN 101088705 A 12/2007

(Continued)

*Primary Examiner* — Darrin D Dunn
(74) *Attorney, Agent, or Firm* — Henry M. Feiereisen LLC

(57) ABSTRACT

To optimize an automatically optimized machining time for machining a workpiece in a machine tool, an original parts program is loaded into a machine tool controller. The machining of the workpiece using the original parts program is simulated, where a motion path generated by the original parts program in the machine tool is determined. The motion path is classified into at least one area of potential optimization in which there is no workpiece contact. The at least one area of potential optimization is assigned a tolerance space. An optimized motion path is determined within the tolerance space. The machining of the workpiece using the modified parts program is simulated. The optimized motion path is displayed and marked. Once a user has approved the modification in the parts program, machining of the workpiece takes place using the modified parts program.

9 Claims, 2 Drawing Sheets

(58) Field of Classification Search
CPC .......... G05B 2219/43203; G05B 2219/49143; G05B 2219/49157; G05B 19/4068; G05B 19/4166; G05B 2219/35306; G05B 2219/35308; G05B 2219/36252; G05B 2219/37237; G05B 2219/37345; G05B 2219/40317; G05B 2219/40476; G05B 2219/50174; G06F 17/5009

See application file for complete search history.

(56) References Cited

U.S. PATENT DOCUMENTS

| | | | | |
|---|---|---|---|---|
| 6,675,061 | B2* | 1/2004 | Hirai ................. | G05B 19/4103 318/568.15 |
| 6,856,853 | B2* | 2/2005 | Takahashi .............. | B25J 9/1666 700/178 |
| 7,348,748 | B2* | 3/2008 | Wilson .................. | G05B 19/25 318/567 |
| 7,606,633 | B2* | 10/2009 | Hosokawa ............ | B25J 9/1666 318/568.11 |
| 7,979,254 | B2* | 7/2011 | Ohashi ............... | G05B 19/4069 700/189 |
| 9,134,723 | B2* | 9/2015 | Nonaka ............. | G05B 19/4069 |
| 9,342,065 | B2* | 5/2016 | Nonaka ............. | G05B 19/4069 |
| 9,507,340 | B2* | 11/2016 | Chung ............... | G05B 19/4069 |
| 9,869,994 | B2* | 1/2018 | Ogawa ............... | G05B 19/4097 |
| 10,078,321 | B2* | 9/2018 | Barakchi Fard .... | G06F 17/5009 |
| 10,140,395 | B2* | 11/2018 | Montana ............. | G06F 17/5009 |
| 2003/0163208 | A1 | 8/2003 | Sugiyama et al. | |
| 2004/0225405 | A1* | 11/2004 | Takahashi ............. | B25J 9/1666 700/178 |
| 2006/0058906 | A1* | 3/2006 | Ohashi ............... | G05B 19/4069 700/182 |
| 2008/0018287 | A1* | 1/2008 | Ogawa ............... | G05B 19/4061 318/652 |
| 2008/0021591 | A1* | 1/2008 | Tani .................... | G05B 19/4061 700/178 |
| 2008/0103741 | A1* | 5/2008 | Fukaya ............... | G05B 19/4069 703/7 |
| 2010/0087948 | A1* | 4/2010 | Yamaguchi ........ | G05B 19/4061 700/178 |
| 2010/0114359 | A1 | 5/2010 | Kommareddy | |
| 2012/0283862 | A1* | 11/2012 | Nonaka .............. | G05B 19/4069 700/97 |
| 2013/0245792 | A1* | 9/2013 | Anzai ................ | G05B 19/0426 700/79 |
| 2013/0253694 | A1* | 9/2013 | Chung ............... | G05B 19/4069 700/186 |
| 2015/0039122 | A1 | 2/2015 | Barakchi Fard et al. | |
| 2015/0094848 | A1* | 4/2015 | Bretschneider ........ | B25J 9/1666 700/186 |
| 2015/0268661 | A1* | 9/2015 | Ogawa ............... | G05B 19/4097 700/182 |
| 2015/0338840 | A1* | 11/2015 | Nonaka .............. | G05B 19/4069 700/186 |
| 2015/0355622 | A1 | 12/2015 | Bretschneider et al. | |
| 2016/0098035 | A1 | 4/2016 | Sinn et al. | |
| 2016/0103447 | A1 | 4/2016 | Sinn et al. | |
| 2017/0090454 | A1* | 3/2017 | Barakchi Fard .... | G06F 17/5009 |
| 2017/0212483 | A1* | 7/2017 | Tanaka ................. | G05B 13/042 |
| 2017/0308060 | A1* | 10/2017 | Matsubara ......... | G05B 19/4068 |

FOREIGN PATENT DOCUMENTS

| | | |
|---|---|---|
| CN | 101791770 A | 8/2010 |
| CN | 102331749 A | 1/2012 |
| CN | 105116836 A | 12/2015 |

\* cited by examiner

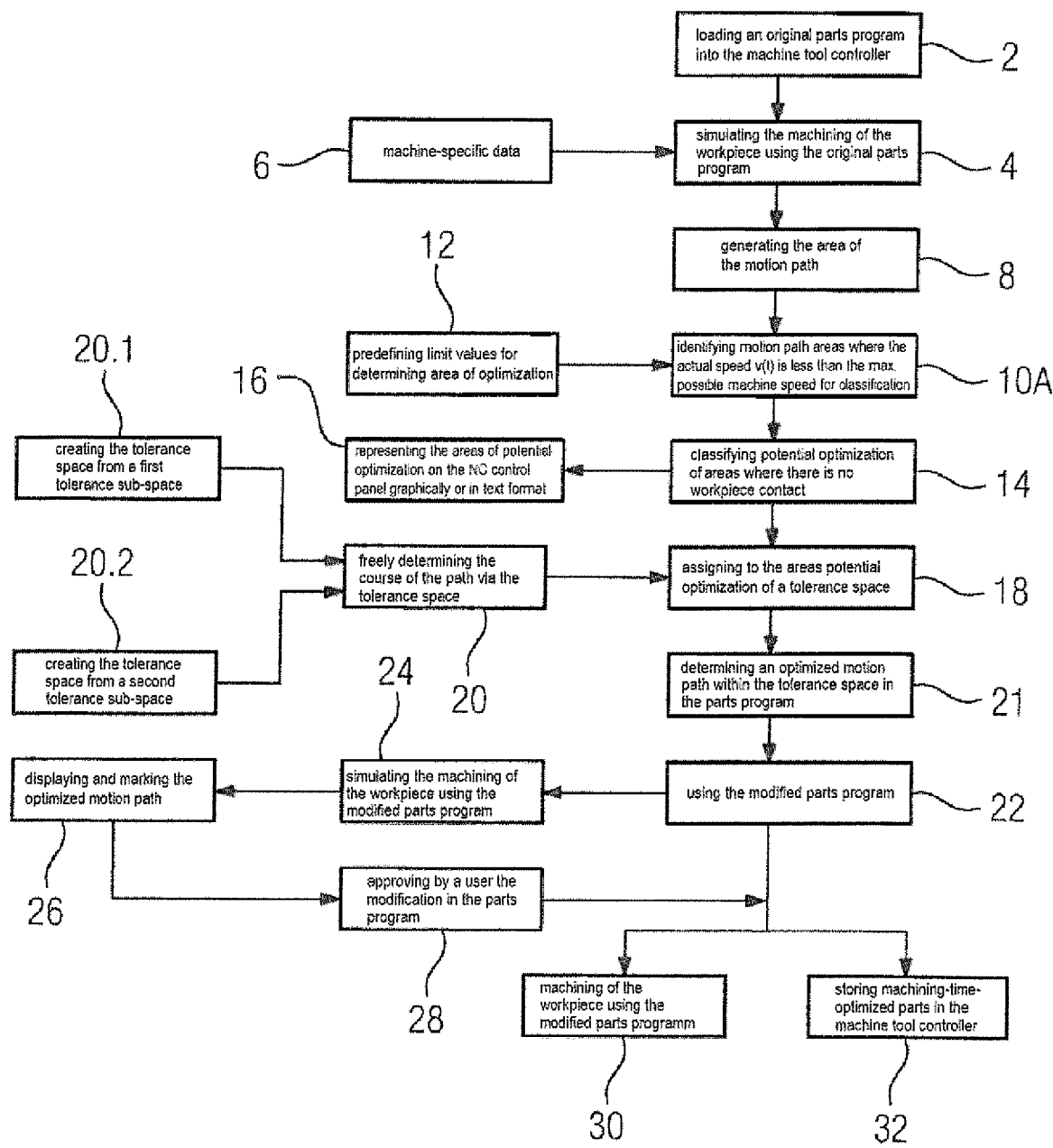

METHOD FOR MACHINING A WORKPIECE IN A MACHINE TOOL WITH OPTIMIZED MACHINING TIME

CROSS-REFERENCES TO RELATED APPLICATIONS

This application claims the priority of European Patent Application, Serial No. EP16160679.3, filed Mar. 16, 2016, pursuant to 35 U.S.C. 119(a)-(d), the content of which is incorporated herein by reference in its entirety as if fully set forth herein.

BACKGROUND OF THE INVENTION

The invention relates to a method for machining a workpiece in a numerically controlled machine tool with an optimized machining time.

The following discussion of related art is provided to assist the reader in understanding the advantages of the invention, and is not to be construed as an admission that this related art is prior art to this invention.

The machining of a workpiece in a machine tool is described by a so-called parts program or NC program. Such an NC program may consist, for example, of drilling a number of holes in a workpiece at a particular spacing.

In the production of workpieces, the machining time required is an important economic factor. In many areas, particularly for producing complex workpieces in large quantities, such as in the automotive or aerospace industry, it is attempted to minimize the machining time so that more workpieces can be fabricated on a machine tool in a shorter time.

Major machine builders or manufacturers have specialist departments engaged in "optimizing a parts program in respect of machining time". This optimizing takes place manually. Manually means that e.g. axis positions s(t) and axis speeds v(t) of all the moved axes are plotted over time during execution of a machining program, specialists analyze these s(t) and/or v(t) plots and relate them to the corresponding point in the parts program in order to be able to carry out local improvements. That point in the parts program is then modified and/or machine parameters affecting the properties of the point to be optimized are changed with the aim of achieving a shorter machining time.

It would be desirable and advantageous to provide an improved method for machining a workpiece in a numerically controlled machine tool to obviate prior art shortcomings and to automatically optimize the machining time.

SUMMARY OF THE INVENTION

According to one aspect of the present invention, a method for machining a workpiece in a numerically controlled machine tool includes connecting the numerically controlled machine tool to a machine tool controller, loading an original parts program into the machine tool controller, simulating a machining of the workpiece using the original parts program to determine a motion path generated in the machine tool controller by the original parts program, classifying the motion path into at least one area of a potential optimization with no workpiece contact, assigning to the at least one area of the potential optimization a tolerance space in which a course of the motion path is open, determining an optimized motion path within the tolerance space by a modification in the parts program with a movement time along the optimized motion path in the tolerance space being shorter than a movement time along an original motion path in the tolerance space, simulating a machining of the workpiece using the modified parts program, displaying and marking the optimized motion path, approving by a user the modification in the parts program, and machining of the workpiece using the modified parts program.

In a method according to the present invention for machining a workpiece in a numerically controlled (NC) machine tool, a machining time can be optimized automatically. The optimized machining time of the workpiece can be reduced compared to the machining time originally required when using the parts program in a specific machine tool. The type and sequence of machining on the workpiece shall not be altered. Only movements that do not take place directly on the workpiece contour may be changed with a view to optimizing the machining time.

In contrast to the hitherto normal procedure, once the parts program has been loaded into the machine tool controller it is not directly activated for machining the workpiece but undergoes preprocessing using the specific parameters of the machine tool. The parts program is automatically examined by the machine tool controller in a simulation analysis in order to find optimization potential in respect of machining time. The machine tool's own machine cycles are disregarded, as a machine tool manufacturer himself already takes care to ensure optimum execution of these cycles peculiar to the machine. The preprocessing relates only to the parts program itself.

The parts program preprocessing is initiated in the machine tool controller in response to an input, e.g. of a machine operator. No machine tool actions such as movements or tool changes, for example, take place during this preprocessing. Simulation of the parts program on the machine tool controller takes place under relevant actual conditions. This aspect is important, as a parts program can have different optimization potentials on different machine tools. In the case of machine tools with low dynamics, i.e. machine tools having quite low maximum acceleration values of axis movements, the main focus of the optimization potential is on "traversing corners".

On the other hand, in the case of machine tools having high dynamics, i.e. high maximum acceleration values of axis movements, "traversing corners" is not generally the dominant factor. For this type of machine tools it may be more important to "parallelize" functionalities. In the parts program this relates particularly to control commands for various machine functions. These would be the M-commands in the case of a parts program which uses so-called G-code. The spindle and the cooling and lubrication, for example, are controlled via the M-commands. If the original parts program provides for turning on spindle cooling (in G-code the "M8" command) between the startup movement and the machining movement, parallelization to optimize the machining time takes place such that the coolant is turned on as early as during the startup movement.

Areas of potential optimization are slow movements of the machine tool axes resulting from unintended programming situations or control interna. Areas of potential optimization are also areas which are deliberately programmed in that manner, but without the intention of producing slow path motions at that point. The slow path motion is primarily due to the interaction of the parts program with the machine tool dynamics, such as maximum possible acceleration and/or maximum possible jerk.

The areas of potential optimization identified using the criterion of absence of workpiece contact are assigned tolerance spaces. This takes place automatically by, for example, allowing retraction planes or retraction spaces for transfer movements (e.g. movement from one milling pocket to the next) at a greater distance from the workpiece in order to achieve a larger manipulation range. The motion paths are open within the tolerance spaces and are then changed with the aim of reducing the time required along the motion path within the tolerance space. In other words, after optimization, the time between entering the tolerance space and exiting the tolerance space is shorter than when using the original parts program.

For safety reasons, simulation of the machining of the workpiece using the parts program which has been automatically modified in this way is again initiated and the result displayed, where the optimized motion paths are then marked. Workpiece machining using the modified parts program is not begun until user approval has been obtained.

The inventive optimization of the machining time does not alter the type and sequence of machining. Only tool or toolholder movements which do not take place on the contour of the workpiece are further analyzed and modified if necessary. This optimization confers a time advantage, but without compromising machining quality.

Further advantageous features are set forth in the dependent claims, and may be combined with one another in any desired manner in order to achieve further advantages.

According to another advantageous feature of the invention, at least one area of potential optimization can be displayed together with a section of the original parts program which predefines a path movement in the at least one area of potential optimization. The machine operator is therefore provided with an important preliminary result of the optimization process. This can be provided graphically or also in the parts program editor. The machine operator can also be given the option of intervening in the optimization process at this juncture.

According to another advantageous feature of the invention, especially in the case of low-dynamics machines, the determining of areas of potential optimization can be restricted to areas of the movement path which require rapid-traverse tool movements. There the axis movements would theoretically have to take place with maximum speed. In these areas of the motion path, there is by nature no workpiece contact.

According to another advantageous feature of the invention, the determining of the at least one area of potential optimization can include instructions for auxiliary functions in the parts program. Therefore, to optimize the machining time, some instructions in the parts program for auxiliary functions such as M-functions in G-code, for example, are carried out in parallel with instructions for axis movements.

BRIEF DESCRIPTION OF THE DRAWINGS

Other features and advantages of the present invention will be more readily apparent upon reading the following description of currently preferred exemplified embodiments of the invention with reference to the accompanying drawings, in which:

FIG. 2 illustrates a block diagram of the basic steps of a second variant of a method for machining a workpiece in a numerically controlled machine tool with an optimized machining time in accordance with the present invention.

DETAILED DESCRIPTION OF PREFERRED EMBODIMENTS

Figure 1:
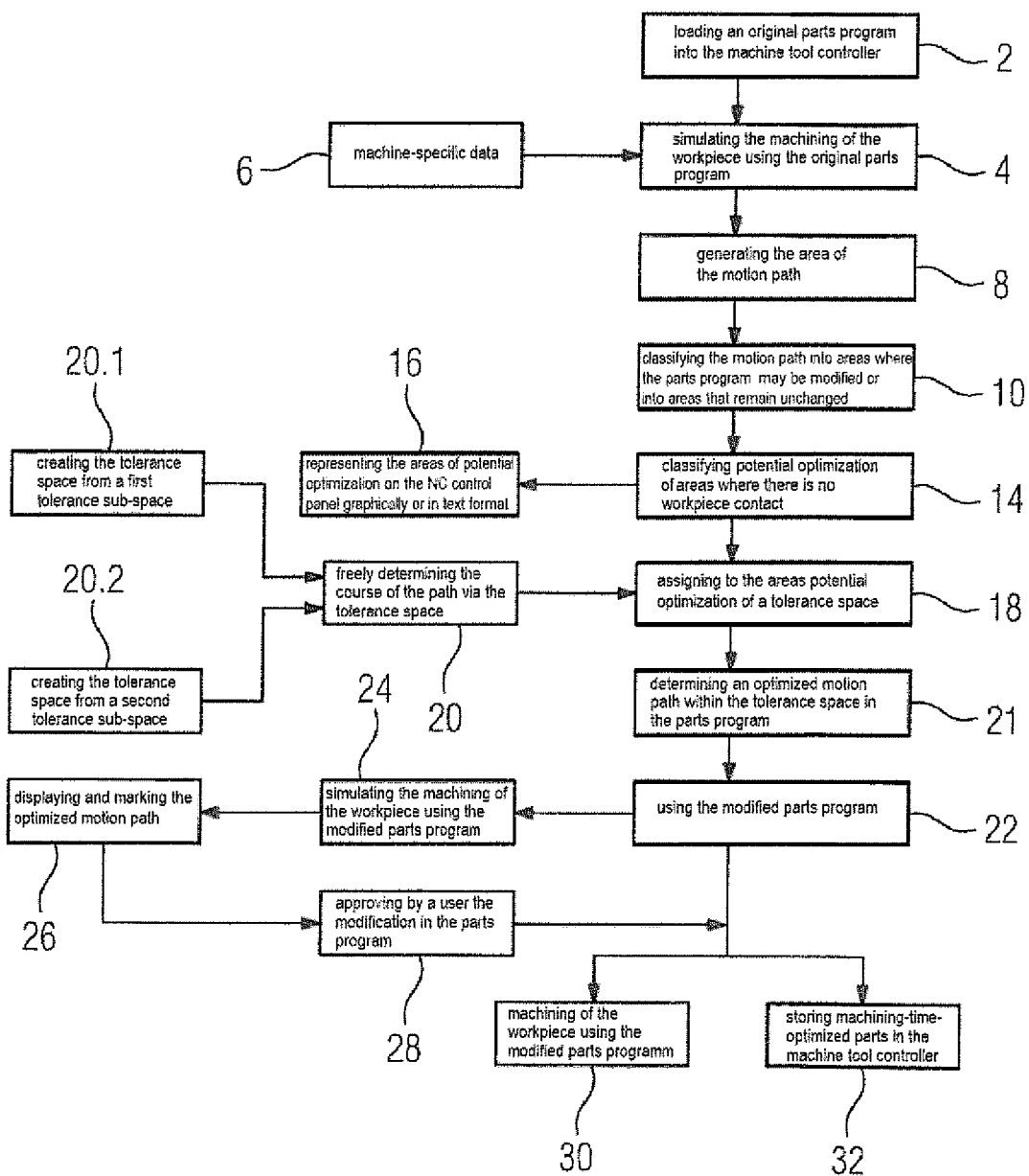
FIG. 1 illustrates a block diagram of the basic steps of a first variant of a method for machining a workpiece in a numerically controlled machine tool with an optimized machining time in accordance with the present invention.

Throughout the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

A numerically controlled machine tool firstly includes the machine tool itself with which a workpiece is machined more or less automatically using cutting tools to produce the desired finished part.

The machine tool is connected to a machine tool controller in which the specifications of the machine tool are stored. These include machine data such as general machine data, channel-specific machine data, axis-specific machine data, driving machine data, etc. and setting data which can be set by the user.

The automatic machining of the workpiece is predefined by a parts program or NC program which specifies the desired shape of the workpiece to be produced and the technology to be used.

The core function of the machine tool controller is to generate setpoint values or reference variables for the individual movement axes of the machine tool from the specifications of the parts program, taking into account the dynamic conditions of the machine tool itself which are stored as machine data in the controller.

The machine tool controller contains a movement calculation program having operations for calculating geometry elements. For machining the workpiece, the machine tool controller is given instructions by means of the parts program for calculating the geometry at interpolation points according to functions or path elements (point-to-point, straight line, circle) with information concerning axis speed and other specifications, such as the control of auxiliary functions, for example (e.g. M8 command: coolant ON), etc. The geometry commands or movement commands are interpreted or processed in the controller and given to the machine tool for execution.

To generate the setpoint values for a desired relative movement between tool and workpiece, a plurality of steps have to be carried out for each motion axis of the machine tool. Motion curves or motion paths are calculated from the program information. From these, reference variables for the displacement-time movement in the coordinates or axes is generated. Finally the movement is controlled in the coordinates or axes in the machine tool.

In addition to the above mentioned displacement control, the core area of a machine tool controller includes other functions such as, for example, tool handling, monitoring and correction calculations, auxiliary function outputs, handling of exceptional situations and alarms, enabling and stopping of movements, override, superimposition of speeds and accelerations, superimposition of movements at movement transitions and real or even virtual movements/axes as well as simulation operating modes.

For machining of the workpiece, the parts program (NC program) is transferred to the machine tool controller where it is executed. When the parts program is initiated on another occasion for identical machining, the machine tool controller normally has no prior knowledge about the earlier execution, i.e. the machine tool controller always calculates all the operations/loops, etc. in the same way as when the parts program executes them for the first time.

The known functionality of the machine tool controller is now extended to optimizing the machining time of a workpiece.

Turning now to the drawing and in particular to FIG. 1, there is shown a block diagram of the basic steps of a first variant of a method for machining a workpiece in a numerically controlled machine tool with an optimized machining time in accordance with the present invention.

In a first process step 2, an original parts program is loaded into the machine tool controller. In a simulation step 4, machining of the workplace using the parts program is simulated taking machine-specific date 6 of the machine tool into account. In the simulation step 4, no actions such as e.g. movements or tool changes, etc. take place in the machine tool. However, the simulation of the parts program on the machine tool controller takes place under relevant actual conditions of the given machine tool.

The result of the simulation step 4 is a motion path 8 in the machine tool specifying at least the location s(t) of a tool or toolholder at each point in time t.

In a subsequent analysis step 10, the motion path 8 is classified into areas in which the parts program may be modified, and into areas in which it must remain unchanged. In the first exemplary embodiment, the areas of the motion path 8 where there is no tool contact are classified as areas of potential optimization 14.

In process step 16, the areas of potential optimization 14 are represented on the NC control panel graphically or in text format. In addition, the associated NC program blocks are given via the program editor.

For each area of the motion path 8, the parts program block which generates that area of the motion path 8 is known in the machine tool controller. The blocks in the parts program which may be changed in order to optimize the machining time are therefore identified in the machine tool controller.

In process step 18, the at least one area of potential optimization 14 is linked to a tolerance space 20 or—in other words—the area of potential optimization 14 is assigned a tolerance space 20. The tolerance space 20 specifies a spatial region around the areas of potential optimization 14 of the motion path 8 in which the course of the motion path can be freely determined. The method for optimizing the machining time can be applied if at least one area of potential optimization 14 exists. Complex workpiece machining processes have a plurality of areas of potential optimization 14. The individual optimization areas 14 are in this case separated from one another by movements involving workpiece contact.

The tolerance space 20 is created from a first tolerance sub-space 20.1 which is predefined by geometry values of the machine tool. The tolerance sub-space 20.1 is typically defined by allowing the retraction space in which the transfer movements take place, i.e. movements without workpiece contact, to be farther from the workpiece in order to obtain a larger manipulation range. For example, the first tolerance sub-space 20.1 can be defined by a space which has a particular minimum distance from the contour of the workpiece and which extends away from the contour of the workpiece. The tolerance sub-space 20.1 can also be defined as a tolerance tube around the motion path 8. In principle, separate limits for the tolerance sub-space 20.1 can be set for each axis, so that, for example, the motion path can deviate from the motion path 8 according to the original parts program by 5 mm in the x-direction and by 20 mm in the y-direction. These numerical values are obviously merely by way of example.

A second tolerance sub-space 20.2 is calculated for each axis on the basis of dynamics data of the controlled machine tool, e.g. maximum acceleration and maximum speed for each axis. This second tolerance sub-space 20.2 created from the dynamics data of the machine tool is determined by the distance required by an axis at maximum acceleration to achieve the maximum speed. The minimum of the tolerances from the first tolerance sub-space 20.1 and the second tolerance sub-space 20.2 is then found. The result is the (resulting) tolerance space 20.

In a next process step 21, optimization of the machining time takes place. Here an optimized motion path is determined which allows the tool or toolholder to be moved in a shortest possible time. The optimization 21 takes place taking into account the spatial conditions or the geometry in which the tool or toolholder can move, and the dynamics of the actual machine tool as predefined by the first and/or second tolerance sub-space 20.1/20.2.

In process step 21, an optimum smoothing length in the motion path is first determined for optimization. For smoothing, individual positions predefined by the NC program are approached only approximately and the movement is not decelerated at these approximately approached positions. In the tolerance space 20, motion control is produced which utilizes the tolerances. It should be noted that the movement does not work and/or smooth individual corners in the motion path 8, but the movement is generated freely and optimally within the tolerance space 20. If the tolerance space 20 is defined by the second tolerance sub-space 20.2, motion control is optimum in respect of machining time, as the movements of the axis can be overlayed with maximum dynamics. If a number of tolerances in the tolerance space 20 are determined from the first tolerance sub-space 20.1, motion control is optimum subject to the secondary condition that geometric boundary conditions must be met.

As already described above, the first tolerance sub-space 20.1 has been predefined in advance by the user, either via a global tolerance or via different axis tolerances or via the geometric space in the machine. The optimization 21 therefore attempts to maintain both the minimum of the first tolerance sub-space 20.1 and the minimum of the second tolerance sub-space 20.2.

The motion path changes are incorporated in the parts program by corresponding modifications. For example, the modification can consist of automatically changing particular geometry elements in the corresponding blocks in the parts program.

In general, the changed blocks are replaced by polynomial, spline or so-called NURBS blocks (NURBS=non-uniform rational B-splines). This results in a geometrically described parts program which can be run on this type of machine in a time-optimized manner. Blocks which must not be changed can be marked in the parts program using the G9 command from the G-code, for example.

Using the modified parts program 22, in a subsequent simulation (process step 24) the motion paths modified according to the optimization 21 are simulated in the machine tool. In process step 26, the changed areas in the motion paths are shown marked on the NC control panel.

Following approval 28 by the machine operator, the actual machining of the workpiece using the machining-time-optimized parts program takes place in process step 30. In addition, in process step 32, the machining-time-optimized parts program is stored in the machine tool controller for machining further similar workpieces.

To reduce the work involved in determining the optimization areas, the above stated criteria can be applied only to areas involving parts program steps with which rapid-traverse tool movements are predefined.

The block diagram in FIG. 2 shows the basic steps of a second variant of a method for machining a workpiece in a numerically controlled machine tool with an optimized machining time. Process steps having the same functions as in the first variant retain the same reference characters as in FIG. 1.

Also in the case of the second variant, in process step 2 an original parts program for machining a workpiece in a numerically controlled machine tool is loaded into the machine tool controller. In process step 4, machining of the workpiece using the original parts program is simulated. At each point in time t, a motion path 8 is determined which, in addition to the distance s(t), also gives at least the speed v(t). In addition, at each point time t, the acceleration a(t) and/or the jerk r(t) can also be determined.

Only the areas of the motion path 8 where there is no workpiece contact may be changed. The areas without workpiece contact are once again generally areas of potential optimization. In the second variant, in process step 10A, motion path areas in which the actual speed v(t) is less than the maximum possible machine speed are identified for classification. In addition, areas having high acceleration values a(t) are identified. High acceleration values mean sudden speed changes. In particular, strong deceleration immediately followed by strong acceleration indicates optimization potential. Jerks r(t) along the motion path can also be evaluated. In process step 10A, the motion dynamics are therefore analyzed. The areas of the motion path in which overshooting or undershooting of limit values is analyzed are classified or identified as areas of potential optimization. The limit values which determine the area of potential optimization in the event of an overshoot or undershoot can be predefined by a machine operator or even by the parts program in a process step 12. In this way at least one area of potential optimization 14 is identified.

The subsequent process steps correspond to the already described process steps of the first variant. In a process step 18, the area or areas of potential optimization 14 are linked to a tolerance space 20. In process step 21, the time-optimized motion path is determined using the tolerance space 20. The subsequent process steps 22, 24, 26, 28, 30 are run through sequentially in a similar manner to the first variant.

In general, after optimization, the motion path 8 becomes "rounder" in the area of potential optimization 14. For example, the originally e.g. "angular" course of the motion path is modified by arcs or spline functions. This produces smaller speed changes while simultaneously reducing the throughput time for the motion path in this area. Only the passage points of the motion path 8 to the tolerance space 20 are fixed and therefore predefined as fixed points for a correspondingly optimized course of the motion path.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed as new and desired to be protected by Letters Patent is set forth in the appended claims and includes equivalents of the elements recited therein:

1. A method for machining a workpiece in a numerically controlled machine tool with an optimized machining time, comprising:
   connecting the numerically controlled machine tool to a machine tool controller;
   loading an original parts program into the machine tool controller;
   determining an original motion path generated in the machine tool controller by the original parts program;
   simulating machining of the workpiece using the original parts program;
   classifying the motion path into at least one area of a potential optimization with no workpiece contact;
   assigning to the at least one area of the potential optimization a tolerance space having a first tolerance sub-space with a geometric extent defined by geometry values of the machine tool and the workpiece in which the motion path is unobstructed, and
   a second tolerance sub-space having a geometric extent defined by dynamic values of the machine tool, wherein at least one of the dynamic values comprises a machine speed;
   determining an optimized tolerance space as the tolerance space having the smaller geometric extent of the first and second tolerance sub-space;
   determining an optimized motion path within the optimized tolerance space having a movement time along the optimized motion path between entering the optimized tolerance space and exiting the optimized tolerance space that is less than a movement time along the motion path in the original parts program;
   simulating machining of the workpiece using a modified parts program that incorporates the optimized motion path;
   displaying and marking the optimized motion path;
   approving by a user the modified parts program; and
   machining of the workpiece with the optimized machining time using the modified parts program.

2. The method of claim 1, further comprising storing the modified parts program for machining at least one other workpiece.

3. The method of claim 1, further comprising:
   limiting the speed to a value less than a highest permissible speed of the machine tool.

4. The method of claim 1, wherein at least one of the dynamic values further comprises an acceleration and/or jerk along the motion path.

5. The method of claim 4, further comprising limiting the acceleration and/or the jerk to a value less than a highest permissible acceleration and/or jerk of the machine toot.

6. The method of claim 1, further comprising displaying the at least one area of the potential optimization together with a section of the original parts program which predefines a path movement in the at least one area of the potential optimization.

7. The method of claim 1, wherein the classifying of the at least one area of the potential optimization is limited to steps of the parts program involving rapid-traverse tool movements.

8. The method of claim 1, wherein the classifying of the at least one area of the potential optimization includes instructions for auxiliary functions in the parts program.

9. The method of claim 1, wherein the modified parts program comprises polynomial, spline or NURBS (non-uniform rational B-splines) blocks.

* * * * *